(12) United States Patent
Tran et al.

(10) Patent No.: US 8,904,150 B2
(45) Date of Patent: Dec. 2, 2014

(54) MICROPROCESSOR SYSTEMS AND METHODS FOR HANDLING INSTRUCTIONS WITH MULTIPLE DEPENDENCIES

(75) Inventors: Thang M. Tran, Austin, TX (US); Leick D. Robinson, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 860 days.

(21) Appl. No.: 13/116,325

(22) Filed: May 26, 2011

(65) Prior Publication Data

US 2012/0303935 A1    Nov. 29, 2012

(51) Int. Cl.
G06F 15/00     (2006.01)
G06F 9/30      (2006.01)
G06F 9/40      (2006.01)

(52) U.S. Cl.
USPC .......................................................... 712/216

(58) Field of Classification Search
None
See application file for complete search history.

(56) References Cited

U.S. PATENT DOCUMENTS 5,699,537 A     12/1997  Sharangpani et al.
5,925,122 A *   7/1999   Ohsawa .......................... 712/210
8,365,015 B1 *  1/2013   Yu et al. ........................... 714/16
2004/0064829 A1 *  4/2004  Pallister et al. ............... 719/327
2006/0218124 A1 *  9/2006  Williamson et al. .............. 707/2
2007/0028078 A1 *  2/2007  Harris et al. .................... 712/214
2010/0250900 A1 *  9/2010  Brown et al. .................... 712/208

OTHER PUBLICATIONS

Mukherjee et al. (Detailed Design and Evaluation of Redundant Multithreading Alternatives, May 2002, pp. 99-110).*
Bai, Y., et al., "A Dynamically Reconfigurable Mixed In-Order/Out-of-Order Issue Queue for Power-Aware Microprocessor", IEEE Computer Society Annual Symposium Proceedings, VLSI, Feb. 20-21, 2003, pp. 139-146.
Raasch, S.E., et al., "A Scalable Instruction Queue Design Using Dependence Chains", IEEE Proceedings of the 29th Annual International Symposium on Computer Architecture, 2002, pp. 318-329.

* cited by examiner

*Primary Examiner* — George Giroux
(74) *Attorney, Agent, or Firm* — Mary Jo Bertani; Joanna G. Chiu

(57) ABSTRACT

A processor includes an instruction unit which provides instructions for execution by the processor, a decode/issue unit which decodes instructions received from the instruction unit and issues the instructions, and a plurality of execution queues coupled to the decode/issue unit. Each issued instruction from the decode/issue unit is stored into an entry of at least one queue of the plurality of execution queues, wherein each entry of the plurality of execution queues is configured to store an issued instruction and a duplicate indicator corresponding to the issued instruction which indicates whether or not a duplicate instruction of the issued instruction is also stored in an entry of another queue of the plurality of execution queues.

20 Claims, 10 Drawing Sheets

MICROPROCESSOR SYSTEMS AND METHODS FOR HANDLING INSTRUCTIONS WITH MULTIPLE DEPENDENCIES

BACKGROUND

1. Field

This disclosure relates generally to computer processor architecture, and more specifically, to configuring a computer processor for handling instructions with multiple dependencies.

2. Related Art

One goal of ongoing processor development is to increase the number of instructions per cycle (IPC). A computer processor's IPC is typically limited by stalling of instructions in queues due to the inability to access memory when instructions are executed in-order. Issuing instructions out-of-order can help to a certain degree, but eventually stalled instructions will block other independent instructions from execution as out-of-order dependent instructions fill up the queue.

Further, there is ever-increasing pressure to reduce power consumption in computer processor devices to conserve available power and extend the operating life of portable devices between re-charging cycles.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
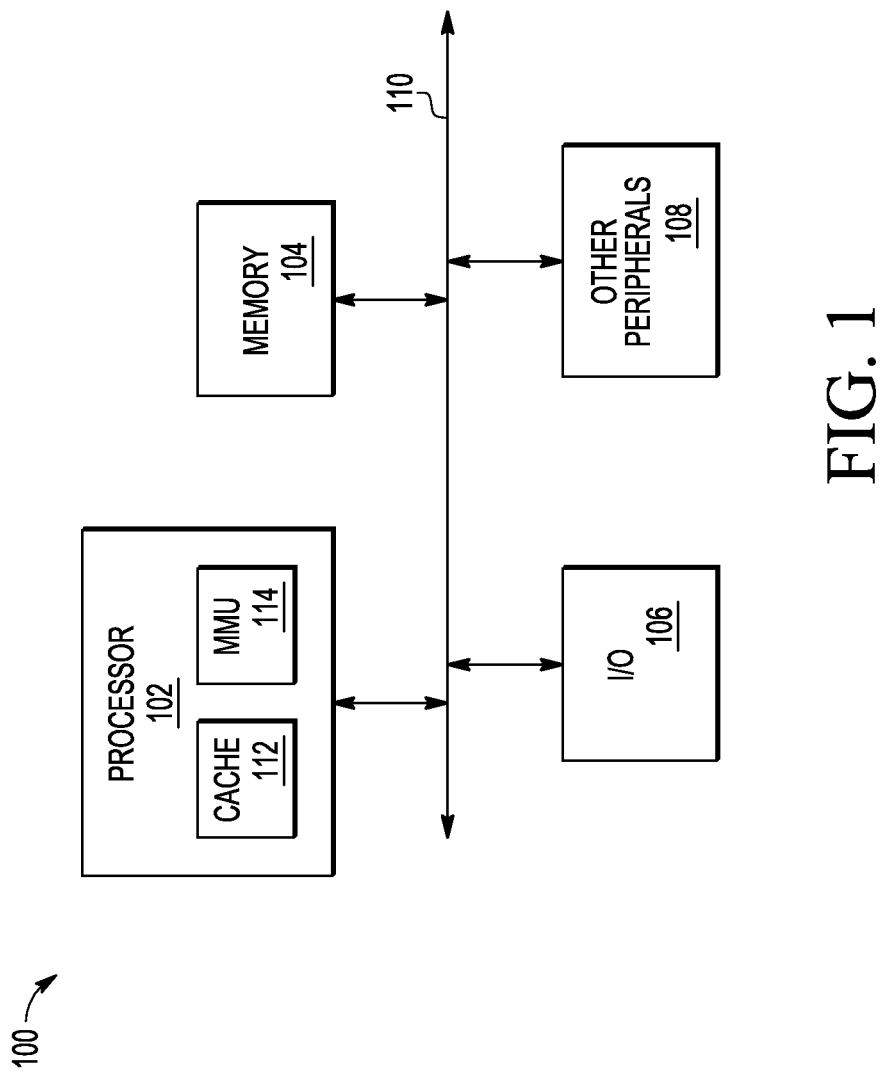
FIG. 1 is a diagram of an embodiment of a computer processing system in accordance with the present disclosure.

FIG. 1 shows a computer processing system 100 in which instruction decode and issue for latency tolerance execution can be implemented according to some embodiments of the disclosure. System 100 can be a superscalar microprocessor architecture in which instructions are issued in order to execution queues and instructions in each execution queue are executed in order but the instructions from different execution queues can execute out-of-order. At comparable performance points, system 100 has the lower power and area requirements than systems that use only out-of-order execution queues.

In the illustrated embodiment, components in computer processing system 100 include processor 102, memory 104, input/output (I/O) handlers/interfaces 106, and other peripheral devices or modules 108 which are bi-directionally coupled to bus 110 to allow communication between components. Processor 102 includes Level 1 cache memory units 112 and memory management unit (MMU) 114.

Bus 110 may communicate external to computer processing system 100. Alternate embodiments of the present disclosure may use more, less, or different components and functional blocks that those illustrated in FIG. 1. As some possible examples, alternate embodiments of computer processing system 100 may include a timer, a serial peripheral interface, a digital-to-analog converter, an analog-to digital converter, a driver (e.g. a liquid crystal display driver), and/or a plurality of types of memory.

MMU 114 is capable of providing various cache memory and bus control signals high-speed as well as virtual address to physical address translation. The virtual address is an address that is generated by processor 102 and as viewed by code that is executed by processor 102. The physical address is used to access the various higher-level memory banks such as a level-one RAM memory. Once processor 102 requests data from memory, MMU 114 can send a task identifier associated to the data request (or more generally to the task that is being executed by processor 102) to memory 104 and also to data cache internal to processor 102.

In alternate embodiments, computer processing system 100 may include one, two, or any number of processors 102. If a plurality of processors 102 are used in computer processing system 100, any number of them may be the same, or may be different. Note that although computer processing system 100 may have a plurality of processors 102, a single processor 102 which by itself can execute a plurality of instruction sets.

Memory module 104 can include a multi-level cache architecture including one or more levels of instruction cache and data cache module that have slower access rates than Level 1 cache modules 112. Memory 104 can also include an external memory that is also referred to as a main memory and can optionally include additional devices such as buffers and the like.

Figure 2:
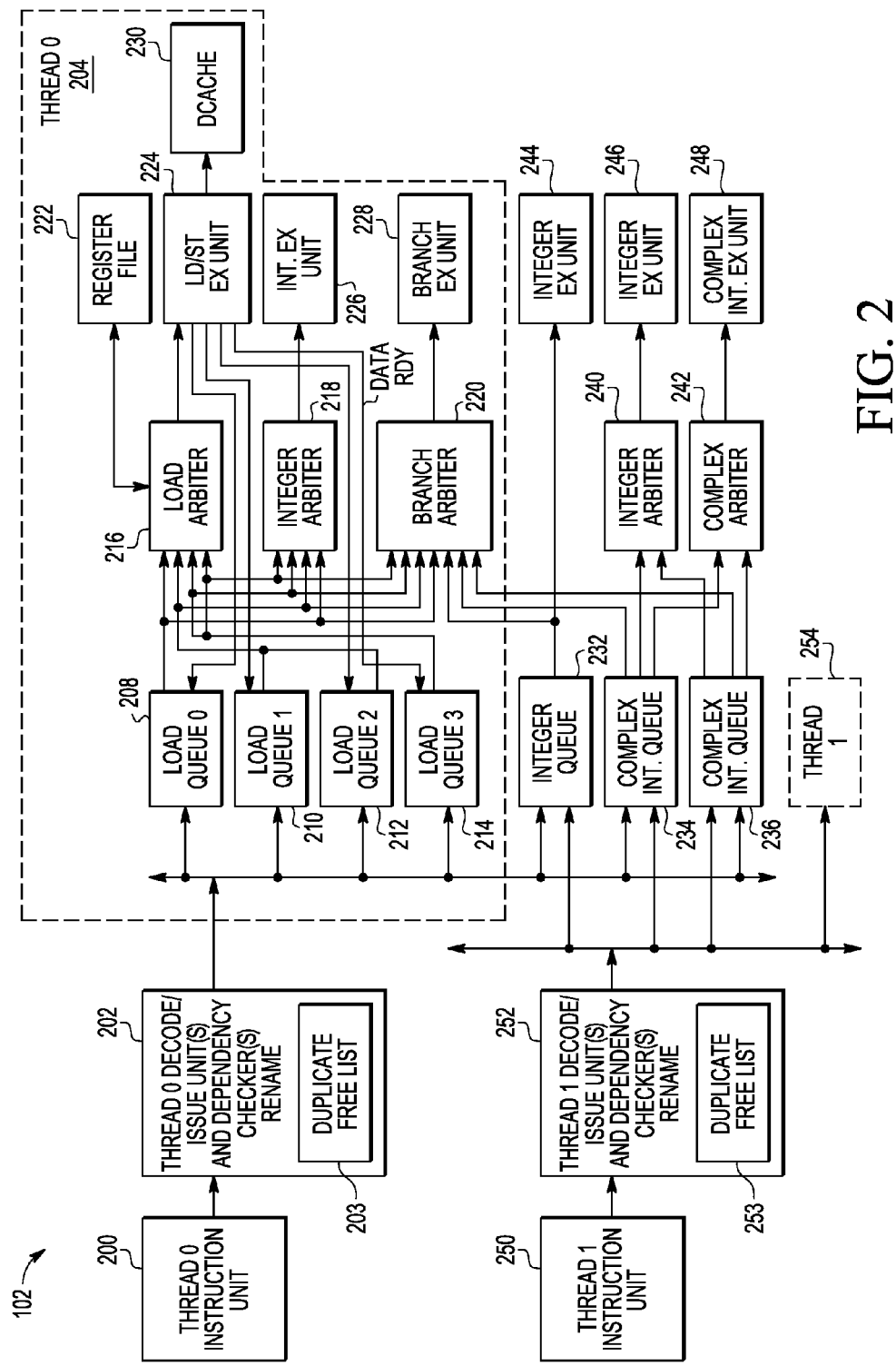
FIG. 2 is a diagram of an embodiment of instruction handling components that can be included in the computer processor of FIG. 1.

FIG. 2 is a diagram of an embodiment of instruction handling components that can be included in computer processor 102 of FIG. 1 with latency tolerance execution of one or more program threads (e.g., Thread0 and Thread1). Thread0 and Thread1 instruction units 200, 250 implement instruction queues configured to provide program instructions to respective decode/issue units 202, 252. Decode/issue units 202, 252 can include logic to multiplex valid instructions, decode instructions for instruction type, source, and destination operands, generate queue entries and tags for instructions, rename instruction operands to a latest register mapping, determine source and destination register dependencies between decoded instructions, check dependency with previous instructions in execution queues, and separate complex instructions into micro-instructions. Decode/issue units 202, 252 also include a duplicate instruction handler that generates respective duplicate free lists 203, 253 to indicate whether an instruction being issued to one of queues 208-214, 232, 234, 236 is a duplicate of an instruction being issued to another one or more of queues 208-214, 234, 236 during the same processor clock cycle. For example, duplicate free lists 203, 253 can include a number of bits, with each bit being used to represent whether a corresponding execution queue 208-214, 232, 234, 236 is free of instructions that are duplicated in another one of queues 208-214, 232, 234, 236.

Decode/issue units 202, 252 issue instructions to execution queues, and update register renaming for issued instructions. In the embodiment shown, a group of components 204 in processor 102 allocated to Thread0 includes load queues 208, 210, 212, 214, integer queue 232, and complex integer queues 234, 236. Another group of components 254 in processor 102 allocated to Thread1 includes a separate set of load queues 208-214, while integer queue 232 and complex integer queues 234, 236 can be shared with Thread0.

Note that although the architecture shows components for Thread0 and Thread1, additional program threads can be executed by processor 102. For example, although not labeled in FIG. 2, the components allocated for Thread0 may be used to execute Thread0 and a Thread2 while components allocated for Thread1 may be used to execute Thread1 and a Thread3. Further, processor 102 may use components for Thread0 and Thread1 to process a greater number of instructions per cycle while executing only one thread at a time. Components that can be duplicated to support multi-threading are shown within a dashed box 204 in FIG. 2 that includes load queues 208-214, load arbiter 216, integer arbiter 218, branch arbiter 220, register file 222, load/store unit 224, integer execution unit 226, branch execution unit 228, and data cache 230.

Processor 102 can further schedule execution of instructions using load arbiter 216, one or more integer arbiters 218, 240, branch arbiter 220, and complex arbiter 242. Load arbiter 216 and integer arbiter 218 can arbitrate execution of load/store and integer instructions in load queues 208-214. Branch arbiter 220 can arbitrate execution of branch instructions in load queues 208-214 as well as integer instructions in integer queue 232 and complex integer queues 234, 236. Integer arbiter 240 and complex arbiter 242 can each arbitrate integer instructions from complex integer queues 234, 236.

Microprocessors that require instructions to be executed in-order experience long delays when data required to execute the instruction is not found in cache memory, i.e., a cache miss occurs. Further, instructions that depend on one another may fill the execution queue and block the execution of independent instructions. Microprocessors that allow out-of-order execution include a replay queue for instructions that experience a data cache miss and constantly check for availability of source operands in order to execute instructions. In contrast, processor 102 includes multiple load queues 208-214 to hold the dependent instructions that experience a cache miss in the same queue until completion instead of replaying or re-issuing instructions while independent instructions are free to issue from other execution queues. Additionally, when an instruction issues, since the instructions in queues 208-214 can be in-order, data for source operands will be available from result forwarding or from register file 222. In many cases, it is possible to statistically determine when data for the source operands of an instruction will be available and schedule accordingly. However, in some cases, such as Level-1 data cache misses, the data may not be available as expected. In cases where instructions are dependent on two load instructions, the dependent instructions can be sent to two different queues 208-214. The dependent instruction in one of queues 208-214 will then be invalidated when the copy of the instruction reaches the head of another of queues 208-214.

In single thread mode, processor 102 can concurrently send two instructions to decode/issue unit 202 and one instruction to decode/issue unit 252 resulting in execution of three instructions per cycle. In multi-thread mode, two threads can concurrently send two instructions each to decode/issue units 202, 252 resulting in execution of two instructions per cycle per thread. Decode/issue units 202, 252 can also handle issuing serialize instructions such as instruction exceptions (e.g., Translation Look-aside Buffer miss, breakpoint, and illegal instruction), software interrupts (SWI), and instructions that modify processor configuration and states.

Load arbiter 216 sends instructions to Load/store unit 224. Integer arbiter 218 sends instructions to integer execution unit 226. Branch arbiter 220 sends instructions to branch execution unit 228. Integer queue 232 sends instructions to integer execution unit 244. Integer arbiter 240 sends instructions to integer execution unit 246, and complex arbiter 242 sends instructions to complex integer execution unit 248. Note that integer arbiters 218 and 240 can be combined into one arbiter that receives instructions from load queues 208-214 and complex integer queues 234, 236, and send instructions to integer execution unit 226.

Load instructions from load queues 208-214 dispatch to load/store unit 224 and will remain in a respective queue until data is returned in the next clock cycle, effectively blocking all dependent instructions until valid data is returned in the next clock cycle. Load/store unit 224 can send data ready signals to load queues 208-214 when a cache hit is detected from data cache 230. The bottom entries of load queues 208-214 can send an entry or tag that includes time stamp information to load arbiter 216. The time stamp information allows load arbiter 216 to determine and send the oldest instruction to load/store unit 224. Alternatively, load/store arbiter 216 can receive and send instructions on a round robin basis, where the first instruction that reaches arbiter 216 is the first instruction sent to load/store unit 224. The round robin basis is matched by decode/issue units 202, 252 for issuing independent load/store instructions to load queues 208-214.

Figure 3:
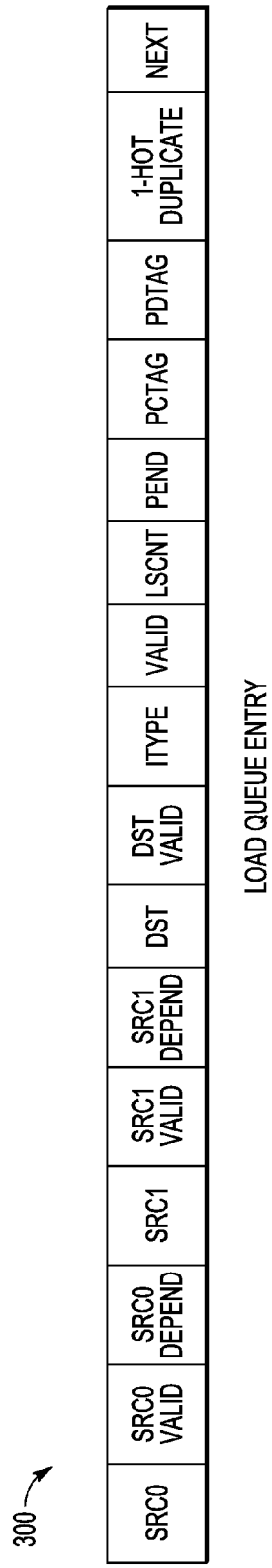
FIG. 3 is a diagram of an embodiment of an execution queue entry in the computer processor of FIG. 2.

FIG. 3 is a diagram of an embodiment of a load/store execution queue entry 300 that can be used in the computer processor of FIG. 2 that includes several fields or tags with the following labels and corresponding significance:

| | |
|---|---|
| SRC0 | first source operand |
| SRC0_VALID | first source operand is valid |
| SRC0_DEPEND | first operand depends on immediately preceding instruction in the same queue |
| SRC1 | second source operand |
| SCR1_VALID | second source operand is valid |
| SRC1_DEPEND | second operand depends on immediately preceding instruction in the same queue |
| DST | destination operand in register file to store result of instruction execution |
| DST-VALID | destination is valid |
| ITYPE | type of instruction |
| VALID | instruction entry is valid |
| LSCNT | time stamp for instruction (can be counter value or clock value) |
| PEND | instruction has been sent to load/store execution unit and is waiting for data that is ready to be sent in the next clock cycle |
| PCTAG | location of program counter information |
| PDTAG | location of branch prediction information |
| 1-HOT | bit fields used to indicate whether a queue includes an instruction that is duplicated in another queue |
| DUPLICATE | instruction that is duplicated in another queue |
| NEXT | indicator that next instruction in the queue is to be invalidated due to duplicate instruction in another queue |

Figure 4:
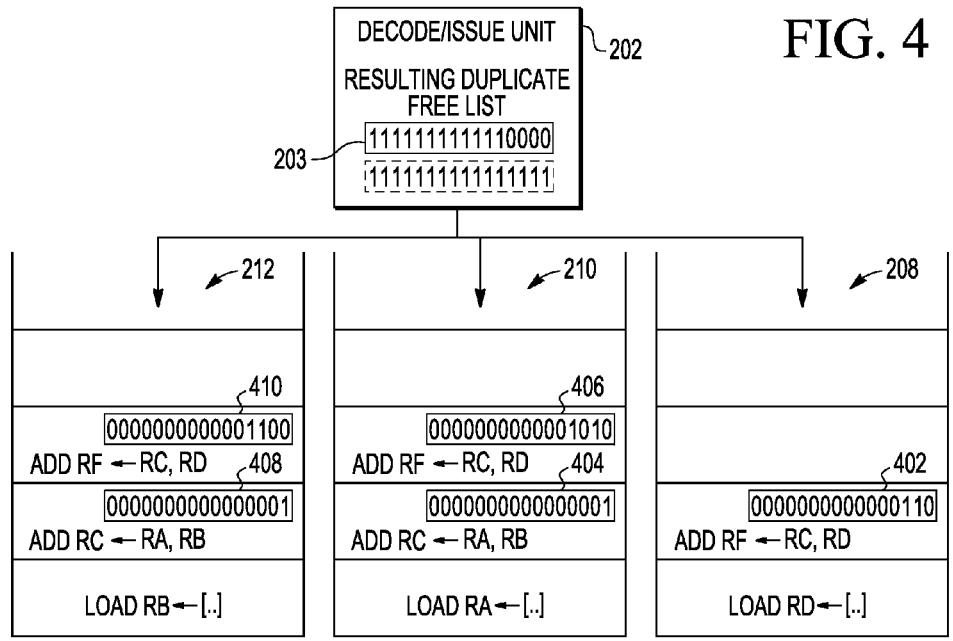
FIG. 4 is a diagram of an embodiment of instructions in execution queues from a decode/issue unit in the computer processor of FIG. 2.

FIGS. 4, 5, 6, and 7 show an example of how duplicate free list 203 and duplicate indicator fields 402, 404, 406, 408, 410 can be used while handling instructions in load execution queues 208-212. Referring to FIGS. 2 and 4, FIG. 4 is a diagram of an embodiment of instructions in execution queues 208, 210, 212 from decode/issue unit 202 in computer processor 102 of FIG. 2. Decode/issue units 202, 252 generate and send respective duplicate free lists 203, 253 to execution queues 208, 210, 212. Note that although execution queues 208-212 are used as an example to explain concepts of the disclosure, other execution queues 214, 234, 236 can receive duplicate free lists 203, 253 along with instructions from respective decode/issue units 202, 252 instead of or in addition to queues 208-212.

Duplicate free lists 203, 253 are used to indicate the number of instructions that are duplicated in execution queues 208-212. In the implementation shown, duplicate free list 203 includes 16 bits, although other implementations of duplicate free list 203 may include any other suitable number of bits or other data structure or logic for indicating duplicate instructions.

Decode/issue unit 202 receives valid instructions, decodes the source and destination operands of the instruction, and checks whether the operands depend on instructions in the execution queues. If there is one or no dependency, duplicate free list is not utilized. If there are two dependencies, one bit from duplicate free list 203 can be set to indicate the duplicate dependency. If there are three dependencies, three bit from free duplicate list 203 can be set to indicate the duplicate dependency. The duplicate free list 203 is then sent to the execution queues that include the duplicate dependencies.

In FIG. 4, load-store execution queue 208 is considered a lower order execution queue than load-store execution queues 210, 212, and load-store execution queue 210 is considered a lower order execution queue than load-store execution queue 212. The bottom entries of load-store execution queues 208-212 are the next instructions to be sent to load-store arbiters 216. The instructions and duplicate indicator 402-410 for each entry that includes a duplicate instruction in load execution queues 208-212 are shown. The initial duplicate free list 203 sent from decode/issue unit 202 is shown above the queues 208-212:

The bottom entries of load-store execution queues 208-212 are the next instructions to be sent to load-store arbiter 216. The bits in duplicate free list 203 are set to one (1) if the bit is available or free to be used, and are set to zero (0) if being used to indicate duplicate instructions. For example, the right-most bit (bit zero) of duplicate free list 203 is set to zero to indicate duplicate instructions (ADD RC←RA, RB) in the next-to-bottom entries of queues 210 and 212 as indicated by duplicate indicators 404 and 408. The next three bits (bits one, two, and three) of duplicate free list 203 are set to zero to indicate duplicate instructions (ADD RF←RC, RD) in the next-to-bottom or second entry of queue 208 and the third entries of queues 210 and 212 as indicated by duplicate indicators 402, 406, and 410.

In some embodiments, duplicate indicators 402-410 can be implemented as a field of a number of bits in a queue entry. The example duplicate indicators 402-410 shown in FIGS. 4-7 use a field of 16 bits. The duplicate indicator can be implemented using other data structures or techniques, however.

Control logic in queues 208-212 receive the duplicate free list 203 and generates duplicate indicators 402-410 for each queue entry that includes a duplicate instruction. In the implementation shown, bit zero is set to one to indicate duplicate instructions in the second entries of queues 210 and 212. Bit patterns of '011', '101', and '110' are used in bits one, two, and three of respective duplicator indicators 402, 406, 410 to indicate the entries of respective queues 208-212 that include a triplicate instruction.

Figure 5:
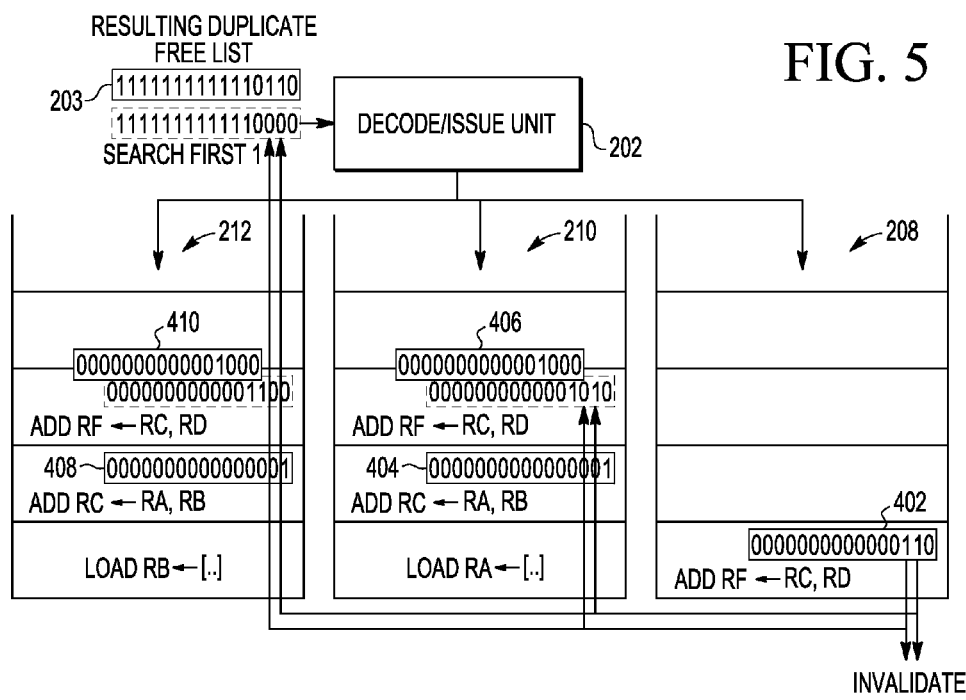
FIG. 5 is a diagram of subsequent instructions in execution queues of FIG. 4.

After the instruction in the bottom entry of the queue 208 is removed, the first instance of the triplicate instruction (ADD RF←RC, RD) moves into the bottom entry of queue 208 and control logic in queue 208 invalidates the instruction. The invalidation is indicated to the other queues 210, 212 by clearing (e.g., setting to zero) the first and second bits of duplicate indicator 402 and sending a copy of duplicate indicator 402 to queues 210, 212 and to decode/issue unit 202. Control logic in queues 210, 212 receives the duplicate indicator 402 and modify respective duplicate indicators 406, 410 to reflect the fact that the instruction (ADD RF←RC, RD) is now only duplicate instead of triplicate. The resulting settings for duplicate indicator 406, 410 are then '0000000000001000'. The resulting duplicate free list 203 generated by decode/issue unit 202 is '1111111111110110' as shown in FIG. 5. Duplicate free list 203 with a bit pattern of '1111111111110110' now indicates that bits zero and three are being used to indicate a duplicate instructions while bits one, two, and four through fifteen are available to use to indicate duplicate instructions in other entries of queues 208-212, or other queues, as required.

Figure 6:
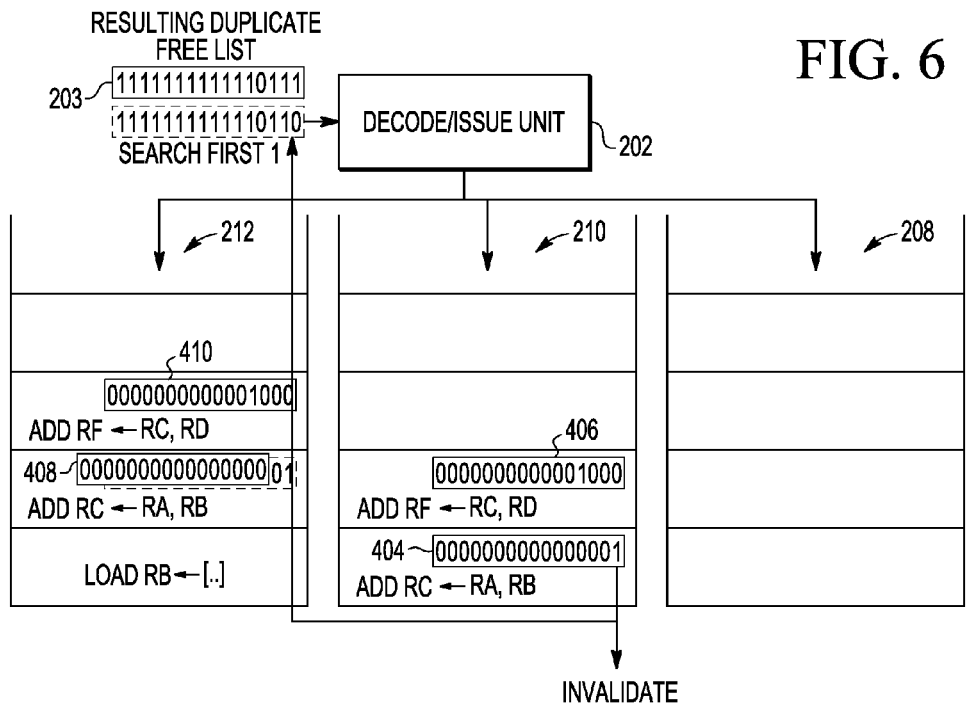
FIG. 6 is a diagram of subsequent instructions in execution queues of FIG. 5.

Referring to FIG. 6, after the instruction in the bottom entry of the queue 210 is removed, the first instance of the now duplicate instruction (ADD RC←RA, RB) moves into the bottom entry of queue 210 and control logic in queue 210 invalidates the instruction. The invalidation is indicated to queue 212 by clearing (setting to zero) the zero bit of duplicate indicator 404 and sending a copy of duplicate indicator 404 to queue 212 and to decode/issue unit 202. Control logic in queue 212 receives the duplicate indicator 404 and modifies duplicate indicator 408 to reflect the fact that the instruction (ADD RC←RA, RB) is not duplicated in any other queues. The resulting bit pattern for duplicate indicator 408 is then '0000000000000000'. The resulting duplicate free list 203 generated by decode/issue unit 202 is '1111111111110111' as shown in FIG. 5. Duplicate free list 203 with a bit pattern of '1111111111110111' now indicates that bit three is being used to indicate a duplicate instruction, while bits zero, one, two, and four through fifteen are available to use to indicate duplicate instructions in other entries of queues 208-212, or other queues, as required.

Figure 7:
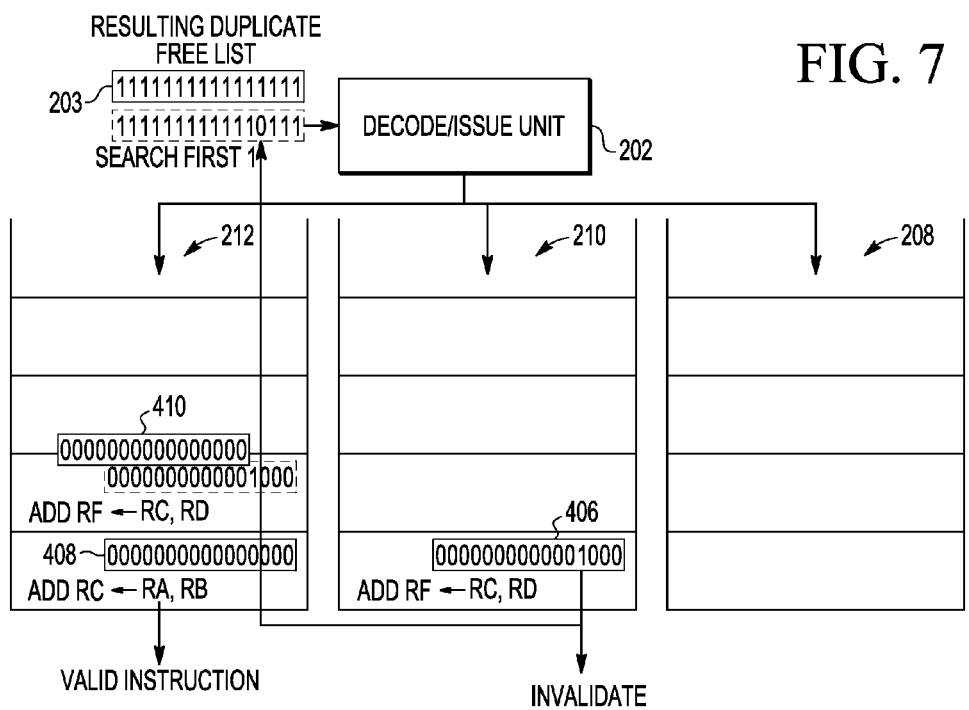
FIG. 7 is a diagram of subsequent instructions in execution queues FIG. 6.

Referring to FIG. 7, after the instruction in the bottom entry of the queue 210 is removed, the duplicate instruction (ADD RF←RC, RD) moves into the bottom entry of queue 210 and control logic in queue 210 invalidates the instruction. The invalidation is indicated to queue 212 by clearing (setting to zero) the third bit of duplicate indicator 406 and sending a copy of duplicate indicator 406 to queue 212 and to decode/issue unit 202. Control logic in queue 212 receives the duplicate indicator 406 and modifies duplicate indicator 410 to reflect the fact that the instruction (ADD RF←RC, RD) is not duplicated in any other queues. The resulting bit pattern for duplicate indicator 410 is then '0000000000000000'. The resulting duplicate free list 203 generated by decode/issue unit 202 is '1111111111111111' which indicates that there are currently no duplicate instructions in queues 208-212 and bits zero through fifteen are available to use to indicate duplicate instructions in entries of queues 208-212, or other queues, as required. Note that instruction (ADD RC←RA, RB) is a valid instruction and is sent to an execution unit from queue 212. Operand RB is forwarded from LOAD RB instruction while operand RA is read from register file 222.

To summarize the operation of duplication free list 203, duplicate indicators 402-410, decode/issue unit 202 and execution queues 208-212 in the preceding example of FIGS. 4-7, an instruction can have two operands that are dependent on two load instructions, such as instruction (ADD RC←RA, RB), which depends on LOAD RB←[ . . . ] and LOAD RA←[ . . . ] instructions in queues 210, 212. The latency of the load instruction is unknown because the load can miss in L1 data cache. Instead of stalling in decode/issue unit 202, the dependent instruction can be issued to two load execution queues, such as queues 210, 212 in the example of FIGS. 4-7.

A bit can be set in duplicate indicators 404, 408. As the duplicate instruction reaches the head of queue 210, the "duplicate" bit in queue 212 is cleared. In case both "duplicate" instructions reach the head of the queue at the same time, a fixed priority can be used to invalidate one instruction as part of collision logic for the load queues. For example, the instruction in the higher order queue can be invalidated and both source operands forwarded to the duplicate instruction.

If an instruction depends on a "duplicate" instruction, another duplicate bit in the duplicate indicator can be set. For simplicity each duplicate instruction can have a different duplicate bit. A free list 203 of duplicated bits is used. One of the bits in duplicate free list 203 is used when the instruction is issued and cleared for re-use when the instruction reaches the bottom entry of a queue.

The second dependent instruction can have dependencies on both the "duplicated" instruction and another load instruction. Instruction (ADD RF←RC, RD) in the preceding example is such an instruction and is issued to three different queues 208, 210, 212. This triplicate instruction sets two duplicated bits in duplicate indicators 402, 406, 410; one bit is for the load instruction and one bit is for the second dependency, as shown in FIG. 4. When the triplicate instruction reaches the bottom entry of queue 208, the instruction is invalidated and one of the duplicated bits in duplicate indicators 406, 410 of the other two queues 210, 212 is cleared, as shown in FIG. 5. The instruction becomes a "duplicated" instruction. When the second of the formerly "triplicate" instructions reaches the bottom entry of a queue, both duplicate bits are cleared in duplicate indicators 406, 410, as shown in FIG. 7. Duplicate free list 203 is also updated.

Figure 8:
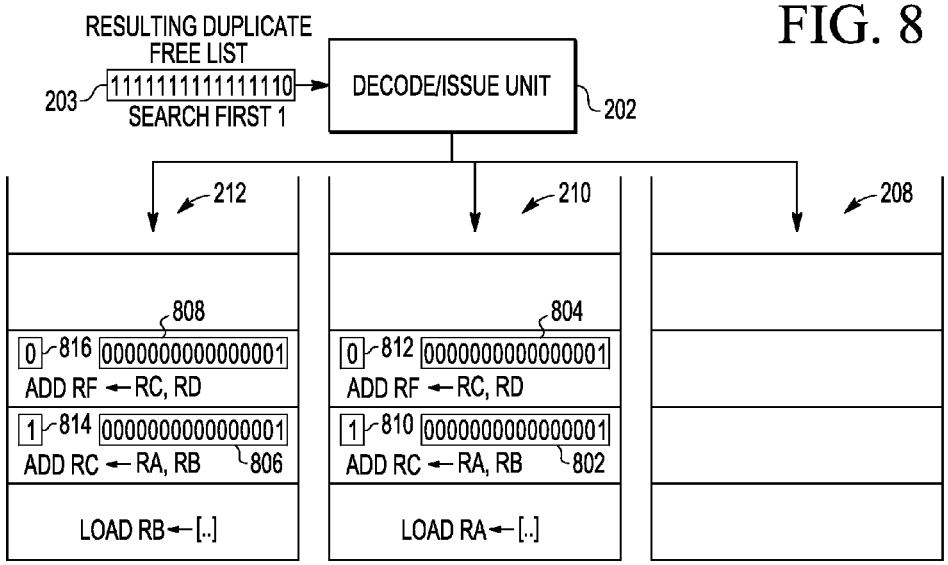
FIG. 8 is a diagram of another embodiment of instructions in execution queues from a decode/issue unit in the computer processor of FIG. 2.
Figure 9:
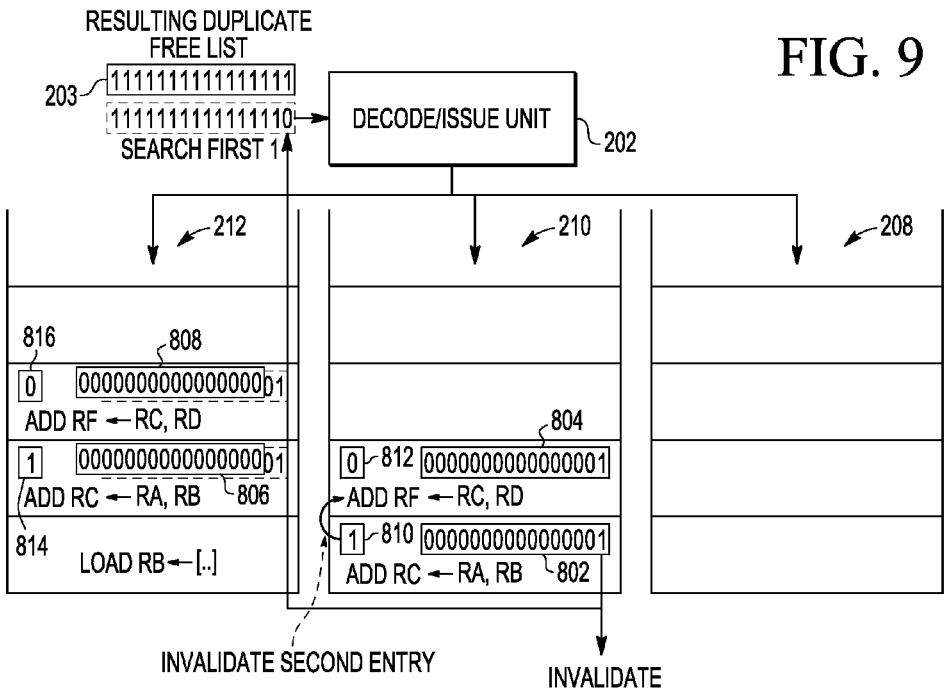
FIG. 9 is a diagram of subsequent instructions in execution queues FIG. 8.
Figure 10:
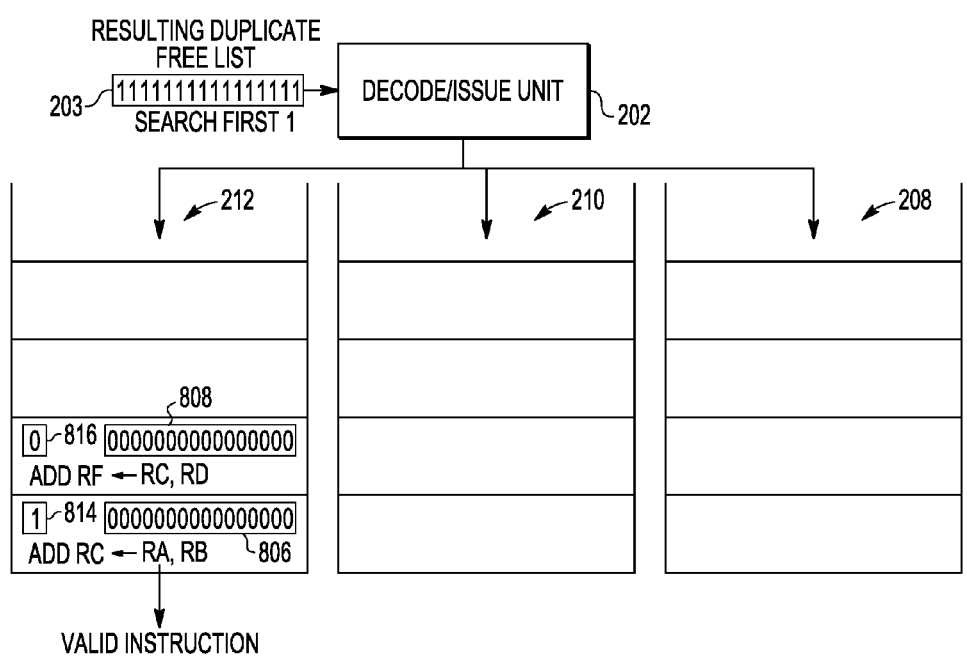
FIG. 10 is a diagram of subsequent instructions in execution queues FIG. 9.

FIGS. 8, 9, and 10 show an example of how duplicate free list 203, duplicate indicator fields 802, 804, 806, 808, and a NEXT indicator can be used while handling dependent instructions in load execution queues 208-212. In FIG. 8, load execution queues 208-212 include instruction entries, duplicate indicators 802-808, and NEXT indicators 810-816 for each entry that includes a duplicate instruction. NEXT indicators 810-816 in respective queues 210, 212 are used to indicate whether or not an issued instruction of an immediately subsequent entry of a same queue includes an operand dependency on the previously issued instruction of the entry.

The right-most bit (bit zero) of duplicate free list 203 is set to zero to indicate duplicate instructions (ADD RC←RA, RB) in the next-to-bottom entries of queues 210 and 212. NEXT indicators 810, 814 are set to indicate that the subsequent instruction in respective queues 210, 212 depend on an operand of the current instruction. That is, duplicate instructions (ADD RC←RA, RB) in queues 210, 212 depend on instruction (LOAD RA←[ . . . ]) in queue 210 and on instruction (LOAD RB←[ . . . ]) in queue 212.

Referring to FIG. 9, after the instruction in the bottom entry of queue 210 is removed, the first instance of duplicate instruction (ADD RC←RA, RB) moves into the bottom entry of queue 210 and control logic in queue 210 invalidates the instruction. The invalidation is indicated to queue 212 by clearing (setting to zero) the zero bit of duplicate indicator 802 and sending a copy of duplicate indicator 802 to queue 212 and to decode/issue unit 202. Control logic in queue 212 receives duplicate indicator 802 and modifies duplicate indicator 806 to reflect the fact that the instruction (ADD RC←RA, RB) and instruction (ADD RF←RC, RD) are not duplicated in any other queues. The resulting bit pattern for duplicate indicators 806 and 808 are then '0000000000000000'. The resulting duplicate free list 203 generated by decode/issue unit 202 is '1111111111111111' indicating that bits zero through fifteen are available to use to indicate duplicate instructions in other entries of queues 208-212, or other queues, as required.

Referring to FIGS. 9 and 10, instructions in queue 210 are shifted down by two spaces (and out of queue 210) since NEXT indicator 810 indicated that the subsequent instruction is a duplicated instruction and dependent on the invalidated instruction.

Once the LOAD instruction at the bottom of queue 212 is removed, the next instructions (ADD RC←RA, RB) and (ADD RF←RC, RD) are valid and sent to integer arbiter 218 at the appropriate times. Note that because the duplicate indicator of instruction (ADD RC←RA, RB) is not set, NEXT bit field is ignored by control logic in load queue 212

Figure 11:
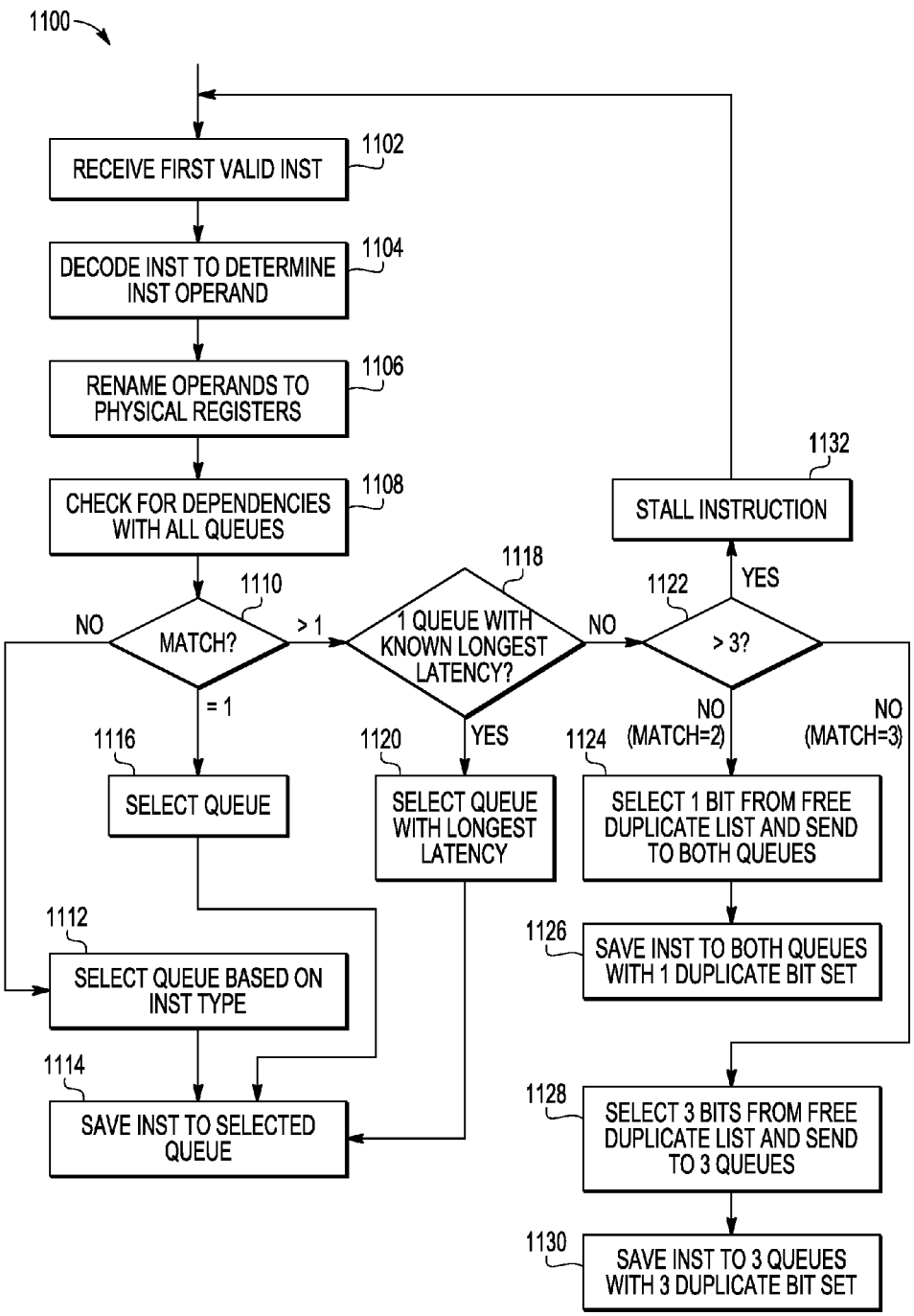
FIG. 11 is a flow diagram of an embodiment of a method for handling a first valid instruction in a decode/issue unit in the computer processor of FIG. 2.

FIG. 11 is a flow diagram of an embodiment of a method 1100 for handling a first valid instruction in decode/issue units in computer processor 102 of FIG. 2, especially the operation of decode/issue units 202, 252. Process 1102 includes a decode/issue unit receiving a valid instruction. Process 1104 includes decoding the instruction to determine the instruction operands. Process 1106 includes renaming operands to physical registers. Process 1108 includes checking for instruction dependencies with all execution queues. For example, process 1108 can determine whether the operands of the received instruction depend on a second instruction stored in one of the execution queues as well as on a third instruction stored in another one of the execution queues.

Process 1110 determines whether an instruction depends on an instruction in another queue. If no dependent instructions are found, process 1112 selects an execution queue based on the instruction type. For example, a load instruction will be issued to a load execution queue, and a branch instruction will be issued to a branch execution queue. Process 1114 includes saving the instruction to the selected execution queue.

Returning to process 1110, if there is one match between the instruction being issued and an instruction in one of the other execution queues, process 1116 selects this queue and process 1114 saves the instruction to the selected queue.

Returning again to process 1110, if there is more than one match between the instruction received and the instructions in the other execution queues, process 1118 determines whether there is one execution queue with known longest latency. If there is one execution queue with the longest latency, process 1120 includes selecting the execution queue with the longest latency and process 1114 includes saving the instruction to the selected queue.

If there is no execution queue with the longest latency, process 1122 includes determining whether there are more than three instructions whose operands depend on one another. If the instruction depends on more than three instructions in three execution queues, process 1132 stalls the instructions for one or more clock cycles and returns to process 1102. If process 1122 determines the instruction depends on two instructions in the execution queues, process 1124 includes selecting one bit from a free duplicate list and saving the duplicate indicator and the instruction to the selected execution queues. Process 1126 includes saving the instruction to both execution queues along with a "1-hot duplicate" indicator that indicates a duplicate instruction exists in another execution queue.

If process 1122 determines the instruction depends on more than three instructions in three execution queues, process 1128 includes selecting three bits from a free duplicate list to indicate the number of duplicate instructions and sending the duplicate indicator to the execution queues that include the duplicate instructions. Process 1130 includes saving the instructions to three execution queues along with a "1-hot duplicate" indicators that indicate three duplicate instructions exist in the execution queues.

Figure 12:
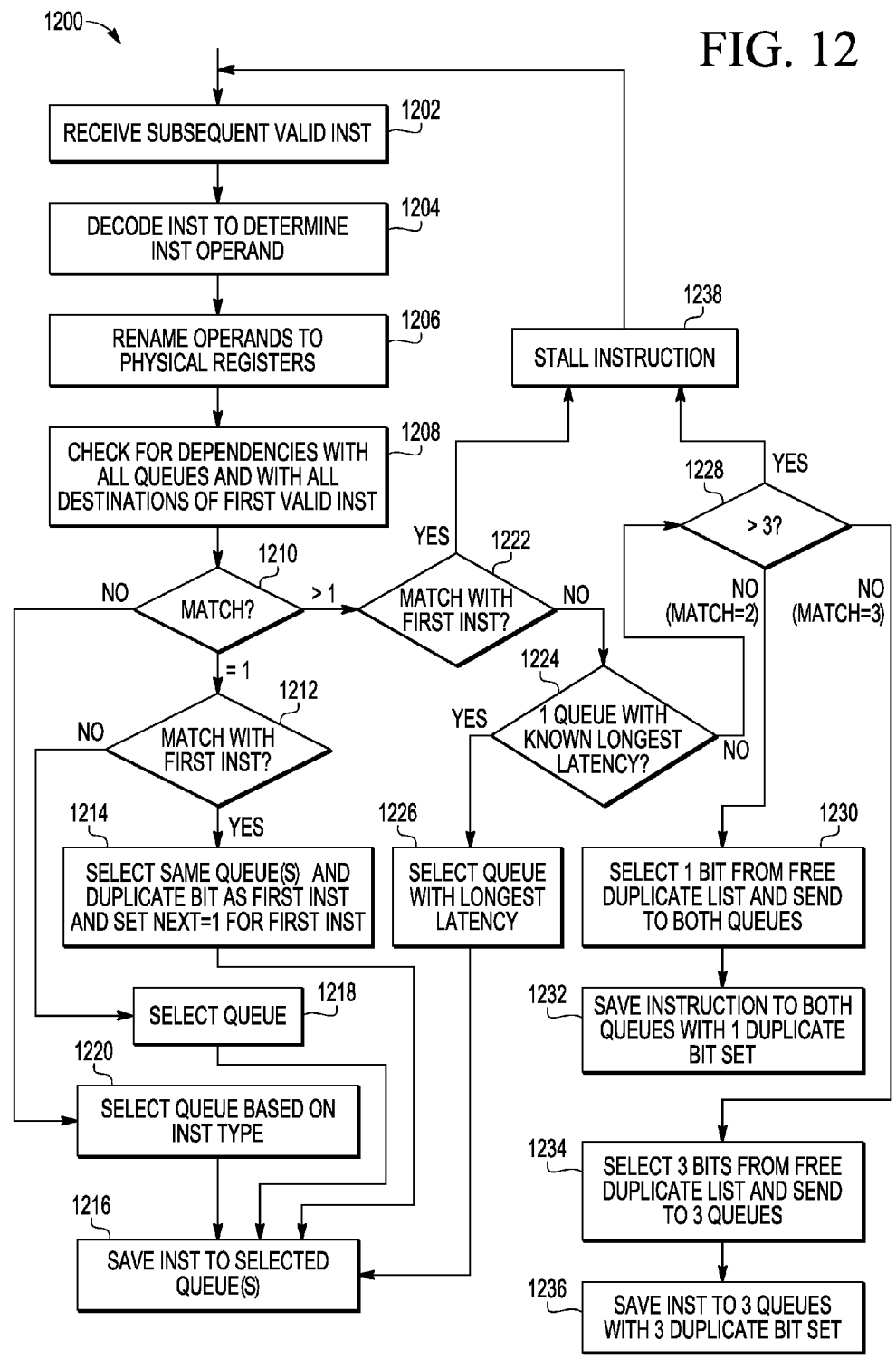
FIG. 12 is a flow diagram of an embodiment of a method for handling subsequent valid instructions after a first valid instruction is received in the computer processor of FIG. 2.

FIG. 12 is a flow diagram of an embodiment of a method for handling subsequent valid instructions after a first valid instruction is received in decode/issue units 202, 252 in computer processor 102 of FIG. 2. Process 1202 includes a decode/issue unit receiving a subsequent valid instruction. Process 1204 includes decoding the instruction to determine the instruction operands. Process 1206 includes renaming operands to physical registers. Process 1208 includes checking for instruction operand dependencies with execution queues and with destination operands of the first valid instruction received in process 1100 (FIG. 11). For example, process 1208 can determine whether the source operands of the received instruction depend on a destination operand for a second instruction stored in one of the execution queues as well as on a destination operand for a third instruction stored in another one of the execution queues.

Process 1210 determines whether an instruction depends on an instruction in another queue. If no dependent instructions are found, process 1220 selects an execution queue based on the instruction type. For example, a load instruction will be issued to a load execution queue, and a branch instruction will be issued to a branch execution queue. Process 1216 includes saving the instruction to the selected execution queue.

Returning to process 1210, if there is one match between the instruction received earlier in process 1100 and the instructions in the other execution queues. If there is one match, process 1212 determines whether there is a match with the first valid instruction received in process 1100. If there is a match with the first valid instruction, process 1214 selects the queue containing the duplicate instruction and also sets a dependency indicator NEXT=1 that indicates that the subsequent instruction in the execution queue is dependent on the preceding instructions. Process 1216 saves the instruction to the selected queue.

Returning to process 1212, if there is no match with the first valid instruction, process 1218 selects an execution queue and process 1216 saves the instruction to the selected queue.

Returning again to process 1210, if there is more than one match between the instruction received and the instructions in the other execution queues and/or the destination of the first valid instruction, process 1222 determines whether there is a dependency between the first and second valid instructions. If there is no match with the first valid instruction, process 1224 determines whether there is one execution queue with known longest latency. If there is one execution queue with the longest latency, process 1226 includes selecting the execution queue with the longest latency and process 1216 includes saving the instruction to the selected queue.

If process 1224 determines there is no execution queue with the longest latency, process 1228 includes determining whether there are more than three instructions whose operands depend on one another. If the instruction depends on more than three instructions in three execution queues, process 1238 stalls the instructions for one or more clock cycles and returns to process 1202. If process 1228 determines the instruction depends on two instructions in the execution queues, process 1230 includes selecting one bit from a free duplicate list and sending the duplicate indicators to the selected execution queues. Process 1232 includes saving the instruction to both execution queues along with a "1-hot duplicate" indicator that indicates a duplicate instruction exists in another execution queue.

If process 1228 determines there are three dependent instructions in the execution queues, process 1234 includes selecting three bits from a free duplicate list to indicate the number of duplicated instructions and sending the duplicate indicator to the execution queues that include the duplicated instructions. Process 1236 includes saving the instructions to three execution queues along with a "1-hot duplicate" indicators that indicate three duplicate instructions exist in the execution queues. Note that in the next cycle, this instruction will be sent to arbiters as in process 1322.

Returning again to process 1222, if there is a match with the first valid instruction, process 1238 stalls the instructions for one or more clock cycles and returns to process 1202, since, in some instances, the process for determining the multi-match dependencies and where to send the second valid instruction may be very complex.

Figure 13:
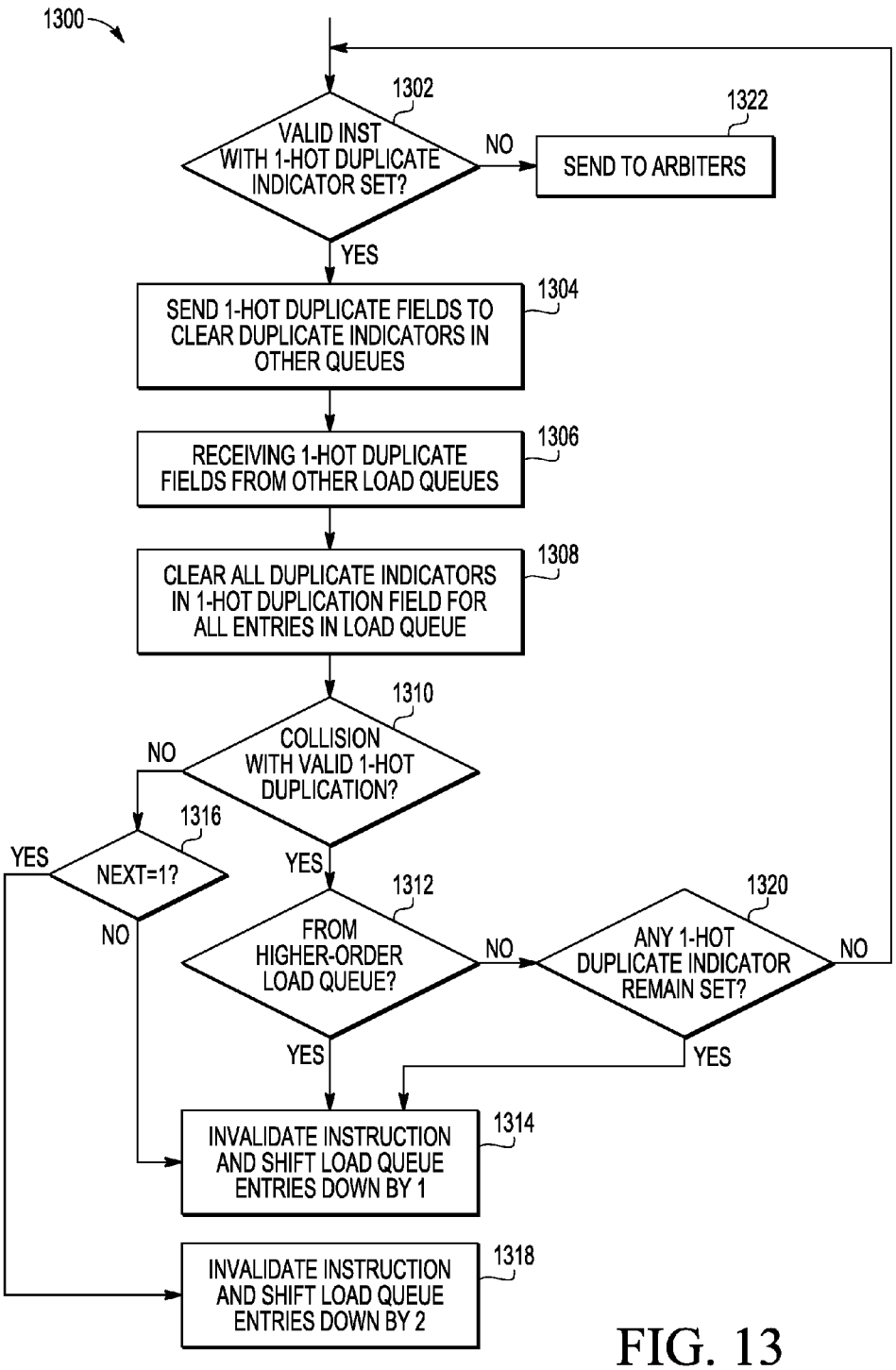
FIG. 13 is a flow diagram of an embodiment of a method for handling bottom entries in execution queues in the computer processor of FIG. 2.

FIG. 13 is a flow diagram of an embodiment of a method 1300 for handling bottom entries in execution queues in the computer processor 102 of FIG. 2. The entries at the bottom of an execution queue are the next instructions to be provided to an arbiter, such as load/store arbiter 216 or branch arbiter 220 (FIG. 2). Process 1302 includes determining whether a duplicate indicator is set for an instruction at the bottom of the execution queue. If the duplicate indicator indicates not set, then the instruction is valid and is sent to arbiters in process 1322. The duplicate indicator indicates that the first instruction located in the bottom entry of the queue is also stored in another execution queue.

If process 1302 determines the duplicate indicator is set for a queue, process 1304 sends a signal based on the corresponding duplicate indicator to the other execution queues to modify the duplicate indicator, for example, to clear the duplicate indicator. Process 1306 includes receiving duplicate indicators from other load execution queues. Process 1308 includes modifying (e.g., clearing) the duplicate indicators for all entries in a load execution queue based on duplicate indicators received from other load execution queues.

Process 1310 includes determining whether a collision occurs with an instruction in the bottom entry of the first execution queue, that is, whether the bottom entries of two execution queues include the same instruction. When process 1310 determines the instruction located in the bottom entry of the first queue is also stored in the second execution queue, process 1312 determines if the second queue is a higher-order execution queue than the first queue. If the second queue is a higher-order load execution queue than the first load execution queue, process 1314 invalidates the instruction located in the bottom entry of the first load execution queue and shifts the entries in the first load execution queue down by one entry.

Returning to process 1312, if the second queue is not a higher-order load execution queue than the first load execution queue, process 1320 determines whether any duplicate indicators remain set in the first load execution queue in which a collision was detected. If any duplicate indicators remain set in the first load execution queue, process 1314 invalidates the instruction located in the bottom entry of the first load execution queue and shifts the entries in the first load execution queue down by one entry. If process 1320 determines that no duplicate indicators are set in the first load execution queue, control returns to process 1302. Note that in the next cycle, this instruction will be sent to arbiters as in process 1322.

Returning to process 1310, if a collision did not occur with an instruction in the bottom entry of the first execution queue, process 1316 determines whether the next indicator, which indicates that the next instruction in the queue depends on the instruction in the bottom entry, is set for the bottom entry. If the next indicator is not set for the bottom entry, process 1314 invalidates the instruction located in the bottom entry of the first load execution queue and shifts the entries in the first load execution queue down by one entry. If the next indicator is set for the bottom entry, process 1318 invalidates the instruction located in the bottom entry of the first load execution queue and shifts the entries in the first load execution queue down by two entries.

In another embodiment, the 1-hot duplicate indicator can be implemented with a duplication tag and a stack of freelist tags. In further embodiments, a combination of both 1-hot duplicate indicators and duplication tags can be used.

In yet another embodiment, the dependency is based on a conditional status bit that can be generated as the result of execution of an instruction such as carry flag, overflow flag, and negative flag.

By now it should be appreciated that systems and methods have been disclosed that include an instruction unit which provides instructions for execution by a processor. A decode/issue unit decodes instructions received from the instruction unit and issues the instructions. A plurality of execution queues are coupled to the decode/issue unit. Each issued instruction from the decode/issue unit is stored into an entry of at least one queue of the plurality of execution queues, and each entry of the plurality of execution queues is configured to store an issued instruction and a duplicate indicator corresponding to the issued instruction which indicates whether or not a duplicate instruction of the issued instruction is also stored in an entry of another queue of the plurality of execution queues.

In another aspect, each entry of the plurality of execution queues is configured to store a dependency indicator corresponding to the issued instruction of the entry which indicates whether or not an issued instruction of an immediately subsequent entry of a same queue of the plurality of execution queues includes a dependency on the issued instruction of the entry.

In another aspect, the duplicate indicator corresponding to the issued instruction indicates how many duplicate instructions of the issued instruction are stored in other queues of the plurality of queues.

In another aspect, the decode/issue unit, in response to receiving a first instruction from the instruction unit, decodes the first instruction to determine operands of the first instruction. When the decode/issue unit determines that the first instruction include a dependency on a second instruction already present in a first queue of the plurality of execution queues and include a dependency on a third instruction already present in a second queue of the plurality of execution queues, the first instruction is stored in a first entry of the first queue and a duplicate indicator of the first entry of the first queue is set to indicate that the first instruction is also stored in another execution queue of the plurality of execution queues. The first instruction is also stored in a first entry of the second queue and a duplicate indicator of the first entry of the second selected queue is set to indicate that the second instruction is also stored in another execution queue of the plurality of execution queues.

In a further aspect, the decode/issue unit, in response to receiving a fourth instruction from the instruction unit, decodes the fourth instruction and determines that the fourth instruction includes a dependency on the first instruction, the fourth instruction is stored in a second entry of the first queue and to a second entry of the second queue. A dependency indicator of the first entry of the first queue is set to indicate that the fourth instruction stored in the second entry of the first queue, which is immediately subsequent to the first entry of the first queue, is dependent upon the first instruction stored in the first entry of the first queue. A dependency indicator of the first entry of the second queue is set to indicate that the fourth instruction stored in the second entry of the second queue, which is immediately subsequent to the first entry of the second queue, is dependent upon the first instruction stored in the first entry of the second queue.

In another aspect, duplicate control circuitry is coupled to each queue of the plurality of execution queues. When a first instruction located in a bottom entry of a first queue of the plurality of execution queues has a duplicate indicator which indicates that the first instruction located in the bottom entry of the first queue is also stored in a second queue of the plurality of execution queues, the duplicate control circuitry of the second queue modifies a duplicate indicator of the first instruction stored in the second queue.

In another aspect, the duplicate control circuitry of the first queue sends a signal based on the duplicate indicator of the first instruction located in the bottom entry of the first queue to the duplicate control circuitry of the second queue, and the duplicate control circuitry of the second queue performs the modification based on the received signal.

In another aspect, when there is no collision present with the first instruction in the bottom entry of the first queue, the duplicate control circuitry of the first queue invalidates the first instruction located in the bottom entry of the first queue.

In another aspect, when a dependency indicator of the first instruction in the first queue indicates that an immediately subsequent entry of the first queue has a second instruction which is dependent on the first instruction and no collision is present with the first instruction in the bottom entry of the queue, the duplicate control circuitry of the first queue invalidates the first instruction located in the bottom entry of the first queue and invalidates the second instruction in the immediately subsequent entry of the first queue.

In another aspect, when the first instruction is located in the bottom entry of the first queue and has a duplicate indicator which indicates that the first instruction located in the bottom entry of the first queue is also stored in the second queue of the plurality of execution queues and the first instruction is located in a bottom entry of the second queue, the duplicate control circuitry of the first queue invalidates the first instruction located in the bottom entry of the first queue if the second queue is a higher-order execution queue than the first queue.

Further aspects include an execution unit and an arbiter coupled to each of the plurality of execution queues and to the execution unit. The execution unit executes instructions of a first instruction type, wherein the arbiter selects a first instruction of the first instruction type from a bottom entry of a selected queue of the plurality of execution queues for execution by the execution unit. A duplicate indicator of the bottom entry of any selected queue indicates that the first instruction is not stored in any other queue of the plurality of execution queues.

In other embodiments, a processor having an instruction unit, a decode/issue unit, and a plurality of execution queues execute a method that includes receiving a first instruction; decoding the first instruction by a decode/issue unit to determine operands of the first instruction; determining that the first instruction include a dependency on a second instruction stored in a first queue of the plurality of execution queues and on a third instruction stored in a second queue of the plurality of execution queues; storing the first instruction in a first entry of the first queue; storing a first duplicate indicator in the first entry of the first queue to indicate that a duplicate instruction of the first instruction is stored in another queue of the plurality of execution queues; storing the first instruction in a first entry of the second queue; and storing a second duplicate indicator in the first entry of the second queue to indicate that a duplicate instruction of the second instruction is stored in another queue of the plurality of execution queues.

In another aspect, the method includes receiving a fourth instruction; decoding the fourth instruction by the decode/issue unit to determine at least one operand of the fourth instruction; determining that the fourth instruction includes a dependency on the first instruction; storing the fourth instruction in a second entry of the first queue; storing the fourth instruction in a second entry of the second queue; storing a first dependency indicator in the first entry of the first queue to indicate that the fourth instruction stored in the second entry of the first queue, which is immediately subsequent to the first entry of the first queue, is dependent upon the first instruction stored in the first entry of the first queue; and storing a second dependency indicator in the first entry of the second queue to indicate that the fourth instruction stored in the second entry of the second queue, which is immediately subsequent to the first entry of the second queue, is dependent upon the first instruction stored in the first entry of the second queue.

In further aspects, the process of determining that the fourth instruction includes a dependency on the first instruction further comprises determining that the first instruction include a dependency on a fourth instruction stored in a third queue of the plurality of execution queues. The method further comprises: storing the first instruction in a first entry of the third queue; and storing a third duplicate indicator in the first entry of the third queue to indicate that a duplicate instruction of the first instruction is stored in another queue of the plurality of execution queues, wherein each of the first duplicate indicator, second duplicate indicator, and third duplicate indicator indicate how many duplicate instructions of the first instruction are stored in other queues of the plurality of execution queues.

In further aspects, each of the first, second, and third duplicate indicators have a different value.

In still other embodiments, a processor includes an instruction unit which provides instructions for execution by the processor, a decode/issue unit which decodes instructions received from the instruction unit and issues the instructions; and a plurality of execution queues coupled to the decode/issue unit, wherein each instruction issued from the decode/issue unit is stored into an entry of at least one queue of the plurality of execution queues. Each of the plurality of execution queues comprises duplicate control circuitry. When a first instruction located in a bottom entry of a first queue of the plurality of execution queues has a corresponding duplicate indicator which indicates that the first instruction located in the bottom entry of the first queue is also stored in another queue of the plurality of execution queues, the duplicate control circuitry of the first queue sends a signal based on the corresponding duplicate indicator to the duplicate control circuitries of the other queues of the plurality of execution queues.

In further aspects of the processor, the duplicate control circuitry of the first queue receives signals from duplicate control circuitries of the other queues of the plurality of execution queues based on duplicate indicators corresponding to instructions in bottom entries of the other queues, and based on the received signals, the duplicate control circuitry of the first queue modifies any duplicate indicators corresponding to any duplicate instruction stored in the first queue which is a duplicate of an instruction stored in any of the bottom entries of the other queues.

In further aspects of the processor, when a duplicate instruction of the first instruction located in the bottom entry of the first queue is not present in any bottom entries of any of the other queues of the plurality of execution queues, the duplicate control circuitry of the first queue invalidates the first instruction located in the bottom entry of the first queue.

In further aspects of the processor, when a dependency indicator of the first instruction in the first queue indicates that an immediately subsequent entry to the bottom entry of the first queue has a second instruction which is dependent on the first instruction and a duplicate instruction of the first instruction located in the bottom entry of the first queue is not present in any bottom entries of any of the other queues of the plurality of queues, the duplicate control circuitry of the first queue invalidates the first instruction located in the bottom entry of the first queue and the second instruction located in the immediately subsequent entry to the bottom entry.

In further aspects of the processor, when the first instruction located in the bottom entry of the first queue is also stored in a bottom entry of a second queue of the plurality of execution queues, the duplicate control circuitry of the first queue invalidates the first instruction in the bottom entry of the first queue if the second queue is a higher-order execution queue than the first queue.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Some of the above embodiments, as applicable, may be implemented using a variety of different information processing systems. For example, although FIG. 1 and FIG. 2 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A processor, comprising:
    an instruction unit which provides instructions for execution by the processor;
    a decode/issue unit which decodes instructions received from the instruction unit and issues the instructions;
    a plurality of execution queues coupled to the decode/issue unit, wherein each issued instruction from the decode/issue unit is stored into an entry of at least one queue of the plurality of execution queues, and wherein each entry of the plurality of execution queues is configured to store an issued instruction and a duplicate indicator corresponding to the issued instruction which indicates whether or not a duplicate instruction of the issued instruction is also stored in an entry of another queue of the plurality of execution queues.

2. The processor of claim 1, wherein each entry of the plurality of execution queues is configured to store a dependency indicator corresponding to the issued instruction of the entry which indicates whether or not an issued instruction of an immediately subsequent entry of a same queue of the plurality of execution queues includes a dependency on the issued instruction of the entry.

3. The processor of claim 1, wherein the duplicate indicator corresponding to the issued instruction indicates how many duplicate instructions of the issued instruction are stored in other queues of the plurality of queues.

4. The processor of claim 1, wherein the decode/issue unit, in response to receiving a first instruction from the instruction unit, decodes the first instruction to determine operands of the first instruction, wherein when the decode/issue unit determines that the first instruction include a dependency on a second instruction already present in a first queue of the plurality of execution queues and include a dependency on a third instruction already present in a second queue of the plurality of execution queues:
    the first instruction is stored in a first entry of the first queue and a duplicate indicator of the first entry of the first queue is set to indicate that the first instruction is also stored in another execution queue of the plurality of execution queues, and
    the first instruction is also stored in a first entry of the second queue and a duplicate indicator of the first entry of the second selected queue is set to indicate that the second instruction is also stored in another execution queue of the plurality of execution queues.

5. The processor of claim 4, wherein the decode/issue unit, in response to receiving a fourth instruction from the instruction unit, decodes the fourth instruction and determines that the fourth instruction include a dependency on the first instruction:
    the fourth instruction is stored in a second entry of the first queue and to a second entry of the second queue,
    a dependency indicator of the first entry of the first queue is set to indicate that the fourth instruction stored in the second entry of the first queue, which is immediately subsequent to the first entry of the first queue, is dependent upon the first instruction stored in the first entry of the first queue; and
    a dependency indicator of the first entry of the second queue is set to indicate that the fourth instruction stored in the second entry of the second queue, which is immediately subsequent to the first entry of the second queue, is dependent upon the first instruction stored in the first entry of the second queue.

6. The processor of claim 1, further comprising:
    duplicate control circuitry coupled to each queue of the plurality of execution queues, wherein when a first instruction located in a bottom entry of a first queue of the plurality of execution queues has a duplicate indicator which indicates that the first instruction located in the bottom entry of the first queue is also stored in a second queue of the plurality of execution queues, the duplicate control circuitry of the second queue modifies a duplicate indicator of the first instruction stored in the second queue.

7. The processor of claim 6, wherein the duplicate control circuitry of the first queue sends a signal based on the duplicate indicator of the first instruction located in the bottom entry of the first queue to the duplicate control circuitry of the second queue, and the duplicate control circuitry of the second queue performs the modification based on the received signal.

8. The processor of claim 6, wherein when there is no collision present with the first instruction in the bottom entry of the first queue, the duplicate control circuitry of the first queue invalidates the first instruction located in the bottom entry of the first queue.

9. The processor of claim 6, wherein when a dependency indicator of the first instruction in the first queue indicates that an immediately subsequent entry of the first queue has a second instruction which is dependent on the first instruction and no collision is present with the first instruction in the bottom entry of the queue, the duplicate control circuitry of the first queue invalidates the first instruction located in the bottom entry of the first queue and invalidates the second instruction in the immediately subsequent entry of the first queue.

10. The processor of claim 6, wherein when the first instruction is located in the bottom entry of the first queue and has a duplicate indicator which indicates that the first instruction located in the bottom entry of the first queue is also stored in the second queue of the plurality of execution queues and the first instruction is located in a bottom entry of the second queue, the duplicate control circuitry of the first queue invalidates the first instruction located in the bottom entry of the first queue if the second queue is a higher-order execution queue than the first queue.

11. The processor of claim 1, further comprising:
an execution unit; and
an arbiter coupled to each of the plurality of execution queues and to the execution unit, wherein the execution unit executes instructions of a first instruction type, wherein the arbiter selects a first instruction of the first instruction type from a bottom entry of a selected queue of the plurality of execution queues for execution by the execution unit, wherein a duplicate indicator of the bottom entry of any selected queue indicates that the first instruction is not stored in any other queue of the plurality of execution queues.

12. In a processor having an instruction unit, a decode/issue unit, and a plurality of execution queues, a method comprising:
receiving a first instruction;
decoding the first instruction by a decode/issue unit to determine operands of the first instruction;
determining that the first instruction include a dependency on a second instruction stored in a first queue of the plurality of execution queues and on a third instruction stored in a second queue of the plurality of execution queues;
storing the first instruction in a first entry of the first queue;
storing a first duplicate indicator in the first entry of the first queue to indicate that a duplicate instruction of the first instruction is stored in another queue of the plurality of execution queues;
storing the first instruction in a first entry of the second queue; and
storing a second duplicate indicator in the first entry of the second queue to indicate that a duplicate instruction of the second instruction is stored in another queue of the plurality of execution queues.

13. The method of claim 12, further comprising:
receiving a fourth instruction;
decoding the fourth instruction by the decode/issue unit to determine at least one operand of the fourth instruction;
determining that the fourth instruction includes a dependency on the first instruction;
storing the fourth instruction in a second entry of the first queue;
storing the fourth instruction in a second entry of the second queue;
storing a first dependency indicator in the first entry of the first queue to indicate that the fourth instruction stored in the second entry of the first queue, which is immediately subsequent to the first entry of the first queue, is dependent upon the first instruction stored in the first entry of the first queue; and
storing a second dependency indicator in the first entry of the second queue to indicate that the fourth instruction stored in the second entry of the second queue, which is immediately subsequent to the first entry of the second queue, is dependent upon the first instruction stored in the first entry of the second queue.

14. The method of claim 12, wherein the step of determining further comprises determining that the first instruction include a dependency on a fourth instruction stored in a third queue of the plurality of execution queues, wherein the method further comprises:
storing the first instruction in a first entry of the third queue; and
storing a third duplicate indicator in the first entry of the third queue to indicate that a duplicate instruction of the first instruction is stored in another queue of the plurality of execution queues, wherein each of the first duplicate indicator, second duplicate indicator, and third duplicate indicator indicate how many duplicate instructions of the first instruction are stored in other queues of the plurality of execution queues.

15. The method of claim 14, wherein each of the first, second, and third duplicate indicators have a different value.

16. A processor, comprising:
an instruction unit which provides instructions for execution by the processor;
a decode/issue unit which decodes instructions received from the instruction unit and issues the instructions; and
a plurality of execution queues coupled to the decode/issue unit, wherein each instruction issued from the decode/issue unit is stored into an entry of at least one queue of the plurality of execution queues, wherein each of the plurality of execution queues comprises:
duplicate control circuitry, wherein when a first instruction located in a bottom entry of a first queue of the plurality of execution queues has a corresponding duplicate indicator which indicates that the first instruction located in the bottom entry of the first queue is also stored in another queue of the plurality of execution queues, the duplicate control circuitry of the first queue sends a signal based on the corresponding duplicate indicator to the duplicate control circuitries of the other queues of the plurality of execution queues.

17. The processor of claim 16, wherein the duplicate control circuitry of the first queue receives signals from duplicate control circuitries of the other queues of the plurality of execution queues based on duplicate indicators corresponding to instructions in bottom entries of the other queues, and based on the received signals, the duplicate control circuitry of the first queue modifies any duplicate indicators corresponding to any duplicate instruction stored in the first queue which is a duplicate of an instruction stored in any of the bottom entries of the other queues.

18. The processor of claim 16, wherein when a duplicate instruction of the first instruction located in the bottom entry of the first queue is not present in any bottom entries of any of the other queues of the plurality of execution queues, the duplicate control circuitry of the first queue invalidates the first instruction located in the bottom entry of the first queue.

19. The processor of claim 16, wherein when a dependency indicator of the first instruction in the first queue indicates that an immediately subsequent entry to the bottom entry of the first queue has a second instruction which is dependent on the first instruction and a duplicate instruction of the first instruction located in the bottom entry of the first queue is not present in any bottom entries of any of the other queues of the plurality of queues, the duplicate control circuitry of the first queue invalidates the first instruction located in the bottom entry of the first queue and the second instruction located in the immediately subsequent entry to the bottom entry.

20. The processor of claim 16, wherein when the first instruction located in the bottom entry of the first queue is also stored in a bottom entry of a second queue of the plurality of execution queues, the duplicate control circuitry of the first queue invalidates the first instruction in the bottom entry of the first queue if the second queue is a higher-order execution queue than the first queue.

* * * * *